United States Patent [19]

Ferguson

[11] Patent Number: 5,056,087

[45] Date of Patent: Oct. 8, 1991

[54] PCM COMMUNICATION SYSTEM

[75] Inventor: Stephen P. Ferguson, Coventry, England

[73] Assignee: GEC Plessey Telecommunications Limited, England

[21] Appl. No.: 485,995

[22] Filed: Feb. 26, 1990

[30] Foreign Application Priority Data

Mar. 10, 1989 [GB] United Kingdom ............... 8905533

[51] Int. Cl.$^5$ ............................................. H04J 3/22
[52] U.S. Cl. ...................................... 370/84; 370/112
[58] Field of Search .................. 370/84, 112, 99, 58.1, 370/58.2, 58.3, 61, 65.5, 68, 110.1, 53, 56

[56] References Cited

U.S. PATENT DOCUMENTS

| | | | |
|---|---|---|---|
| 3,995,119 | 11/1976 | Pachynski, Jr. | 370/112 |
| 4,473,900 | 9/1984 | Belforte et al. | 370/65.5 |
| 4,644,535 | 2/1987 | Johnson et al. | 370/99 |
| 4,716,561 | 12/1987 | Angell et al. | 370/84 |
| 4,759,018 | 7/1988 | Buchner | 370/112 |
| 4,829,518 | 5/1989 | Iquchi et al. | 370/112 |
| 4,914,655 | 4/1990 | Johannes et al. | 370/112 |
| 4,924,464 | 5/1990 | Baylock | 370/99 |

*Primary Examiner*—Benedict V. Safourek
*Assistant Examiner*—Alpus H. Hsu

*Attorney, Agent, or Firm*—Kirschstein, Ottinger, Israel & Schiffmiller

[57] ABSTRACT

A digital communications apparatus for receiving a plurality of parallel digital input signals (IN1 ... IN1 6) all at one rate, and for interleaving multiple bit sequences of a predetermined length from each of the input data streams into a single data stream at a higher rate. The apparatus has a plurality of first stage blocks (BIC1) each adapted to receive a plurality of the input data streams and to output a similar number of data streams at the same bit rate but with the bits of the incoming data signals interchanged. The first stage blocks are connected to a plurality of second stage blocks (BIC2) each connected to said first stage blocks (BIC1) in such a manner that each secondary stage block is connected to a first stage block by a single data stream so that the secondary stage blocks (BIC2) interchange the bits of the already bit-interchanged input signal to generate a plurality of digital output data streams. Depending on the number of input signals to be interleaved the second stage blocks may be similarly connected to third stage blocks, and so on. Finally the apparatus has circuitry (IL) for interleaving the output data streams from the second or final stage blocks to produce the higher rate output data stream.

10 Claims, 8 Drawing Sheets

PCM COMMUNICATION SYSTEM

BACKGROUND OF THE INVENTION

1. Field of the Invention

The present invention concerns digital data transmission systems.

In the realm of digital communications, the use of binary digits, commonly known as "bits", where each symbol is allowed to take one of only two values, is widespread. For certain applications, sets of eight bits are grouped together as a "byte".

2. Description of Related Art

In order to transmit several identical channels over a single, higher rate, bearer, it is also common practise to "bit interleave" the bits from each channel, although recently some national and international standards have suggested that "byte interleaving" should be used. In this case, the high rate bearer carries 8 consecutive bits from the first input channel, followed by 8 consecutive bits from the second, and so on. It is axiomatic that byte interleaving uses eight times as much storage (for example, D-type bistables) as does bit interleaving for the same type of basic processing.

SUMMARY OF THE INVENTION

The present invention is concerned with reducing the amount of processing which has to be performed at the higher rate in order to achieve byte interleaving.

Accordingly the present invention comprises a digital communications apparatus for receiving a plurality of parallel digital input signals all at one rate, and for interleaving multiple bit sequences of a predetermined length from each of the input data streams into a single data stream at a higher rate, the apparatus comprising a plurality of first stage blocks each adapted to receive a plurality of the input data streams and to output a similar number of data streams at the same bit rate but with the bits of the incoming data signals interchanged, a plurality of second stage blocks each connected to said first stage blocks to receive the output streams therefrom in such a manner that each secondary stage block is connected to a first stage block by a single data stream so that the secondary stage blocks interchange the bits of the original input data streams to generate a plurality of digital output data streams with the bits of the output data streams still further interchanged, and means for interleaving the output data streams from the second stage blocks to produce said higher rate output data stream.

Normally said multiple bit sequences will be bytes.

BRIEF DESCRIPTION OF THE DRAWINGS

In order that the invention may be more clearly understood an embodiment thereof will now be described by way of example and with reference to the accompanying drawings, in which.

DETAILED DESCRIPTION OF THE PREFERRED EMBODIMENT

Figure 1:
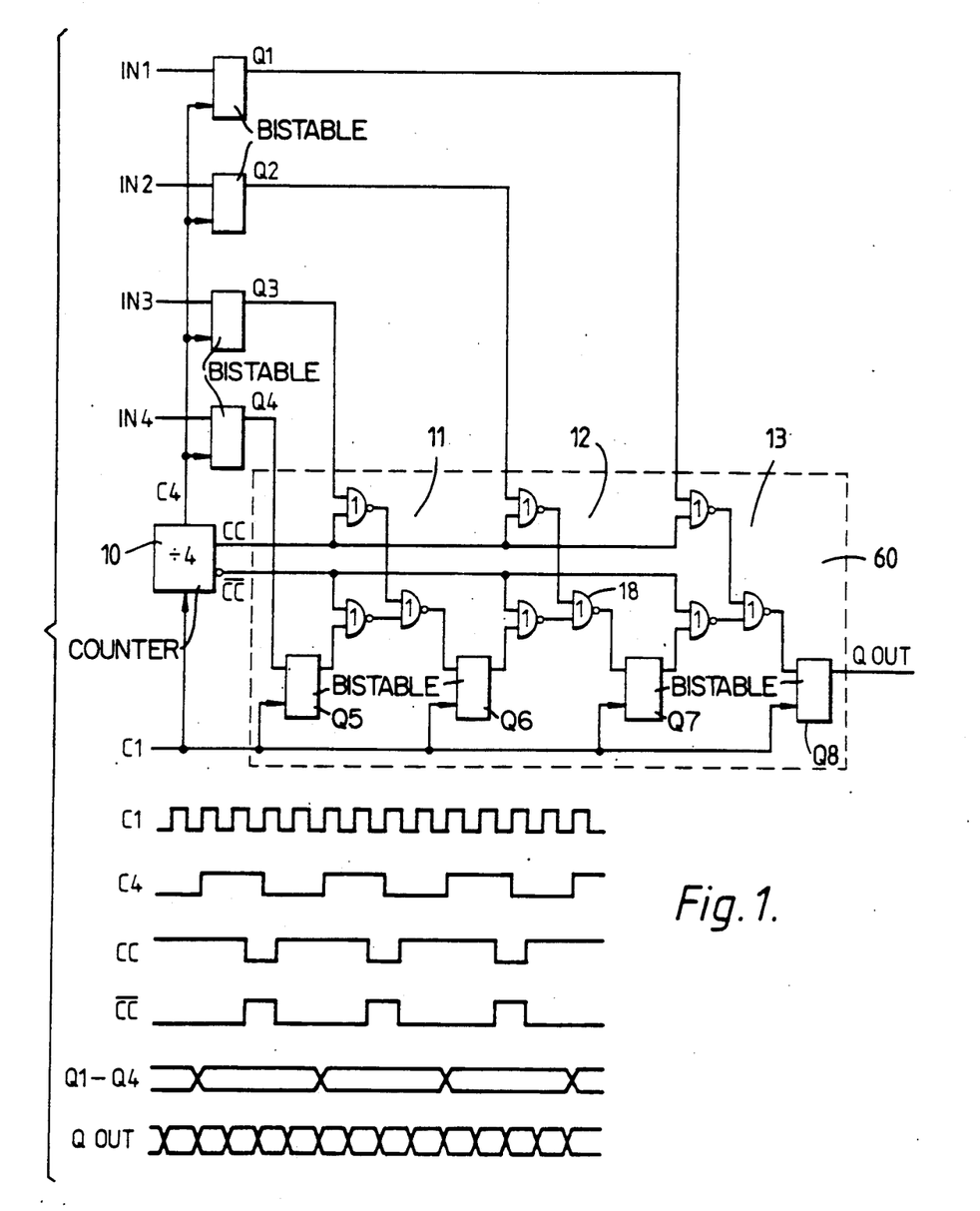
FIGS. 1 and 2 are block diagrams illustrating two known methods of bit interleaving.
Figure 2:
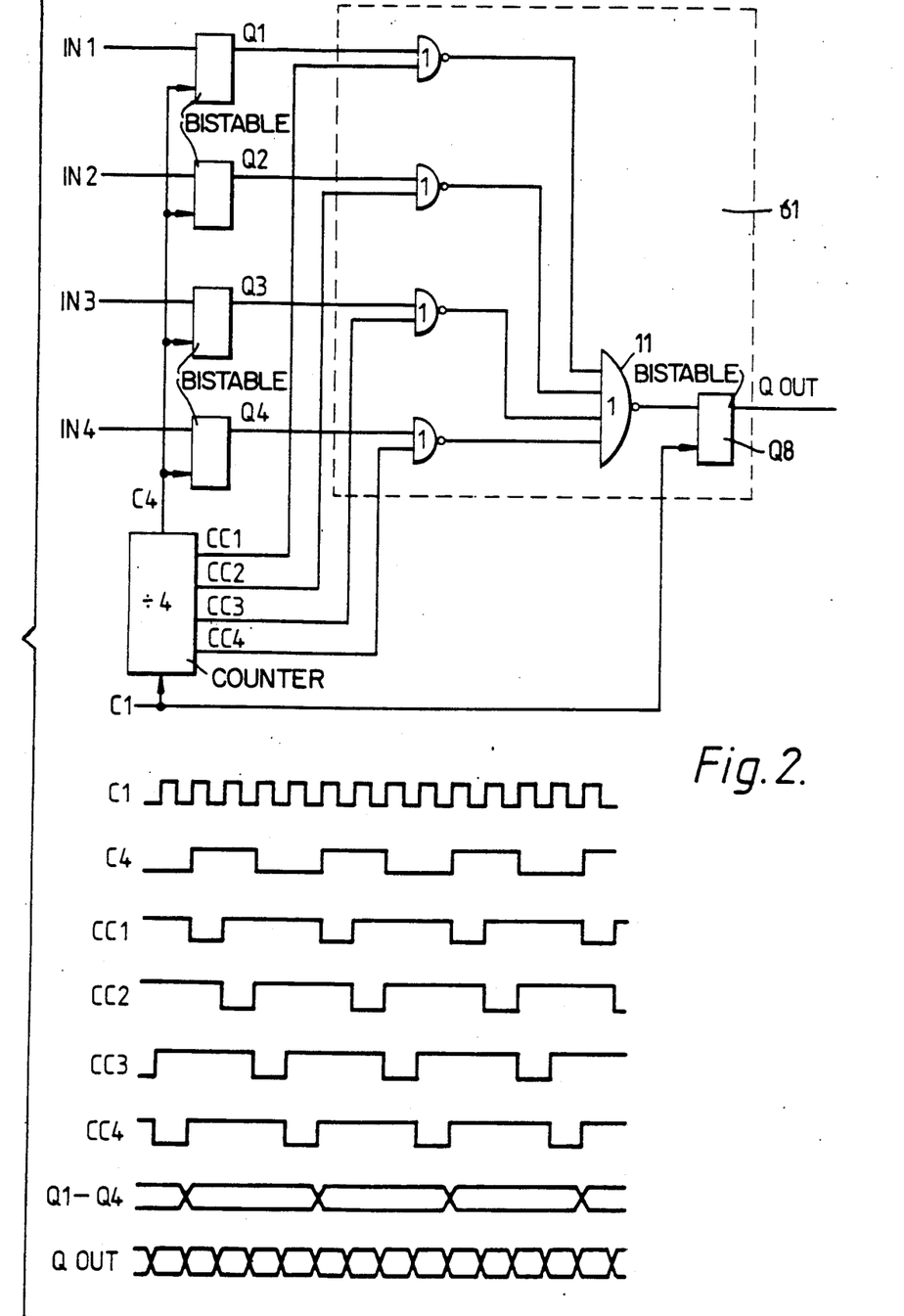

FIGS. 1 and 2 show two known methods of bit interleaving.

FIG. 1 shows four input streams IN1 ... IN4 each of which is taken to an individual flip-flop or bistable Q1, Q2, Q3 and Q4. The bistables Q1 to Q4 are clocked by a divide-by-4 counter 10 driven by a clock signal C1. The output of flip-flop Q4 is taken to a further flip-flop Q5 also clocked by clock signal C1. The output of Q5 is taken to the first of three sets of NOR-gates 11, 12, 13. A representative NOR-gate is identified by reference numeral 18. Each set of NOR-gates consists of a pair of gates each receiving an input from one of the flip-flops Q1 to Q4 and respectively being clocked by a signal cc from counter 10 or by the complemented signal cc. With the outputs from each pair being taken to the third NOR-gate of the set, the output of which third NOR-gate is taken to respective flip-flops Q6, Q7 and Q8 all clocked by C1. All three sets of NOR-gates 11, 12, 13 and flip-flops Q5–Q8 are identified by block 60. The output of Q8 is the final bit-interleaved signal.

FIG. 2 shows a second method known for bit interleaving. As can be seen the method of FIG. 2 has the advantage over that of FIG. 1 of using fewer bistables, but the disadvantage of using a 4 input gate 11 at the output. In the general case of N inputs, it would use an N input gate if the FIG. 2 scheme were to be followed exactly, but variations are possible to reduce the number of inputs per gate at the expense of using more gates and more bistables. The NOR-gates, the multiple input gate 11 and flip-flop Q8 are identified by block 61. The timing diagrams appended to FIGS. 1 and 2 show only nominal times for illustrative purposes.

Figure 3:
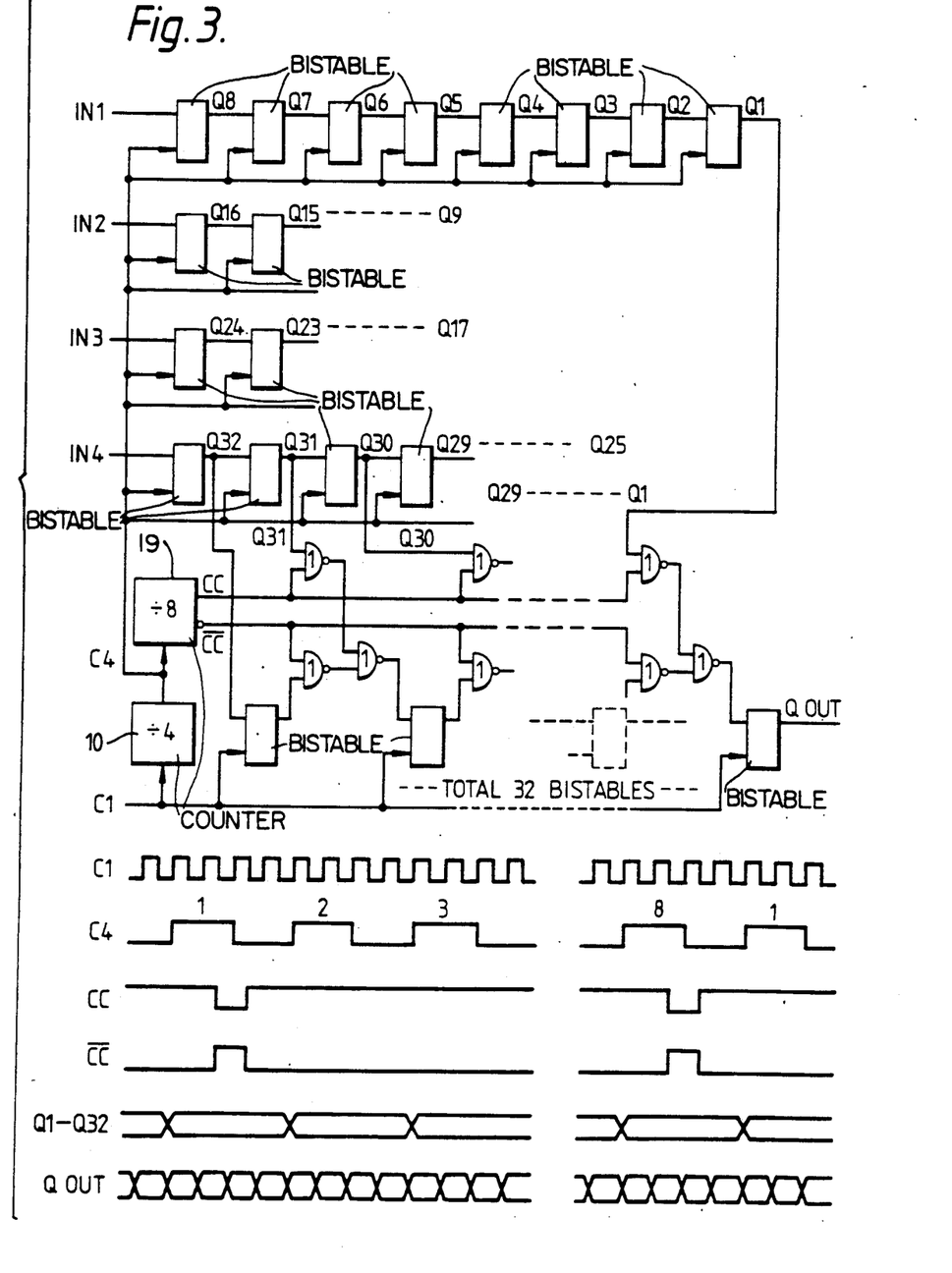
FIG. 3 is a block diagram of a known method of byte interleaving.

FIG. 3 shows a known method for byte interleaving, using principles similar to those of FIG. 1; it has been assumed that the input streams IN1–IN4 are already byte synchronised, and as can be seen from FIG. 3, each single flip flop Q1 to Q4 has been replaced by a sequence of eight similar flip-flops. Furthermore the divide-by-4 circuit 10 is connected to a divide-by-8 circuit 19 which controls the sets of NOR-gates. The divide by 8 circuit 19 is also synchronised to the byte timing. The flip-flops associated with input IN1 have been labelled Q1 to Q8. In all cases the methods are shown with 4 input channels as an example. A method for byte interleaving, using principles similar to those of FIG. 2 is obvious, but is not given in detail here.

The practical realisation of logic processing circuits to carry out the embodiments of figure involves the correct tolerancing of the timing delays of the various logic elements, including allowance for the set-up and hold times of the D-type bistables. In particular, the tolerancing of all the foregoing circuits requires that the permitted delays of all the elements shown in the figures are related to the output symbol rate, that it, to the shortest repetition period.

Figure 4:
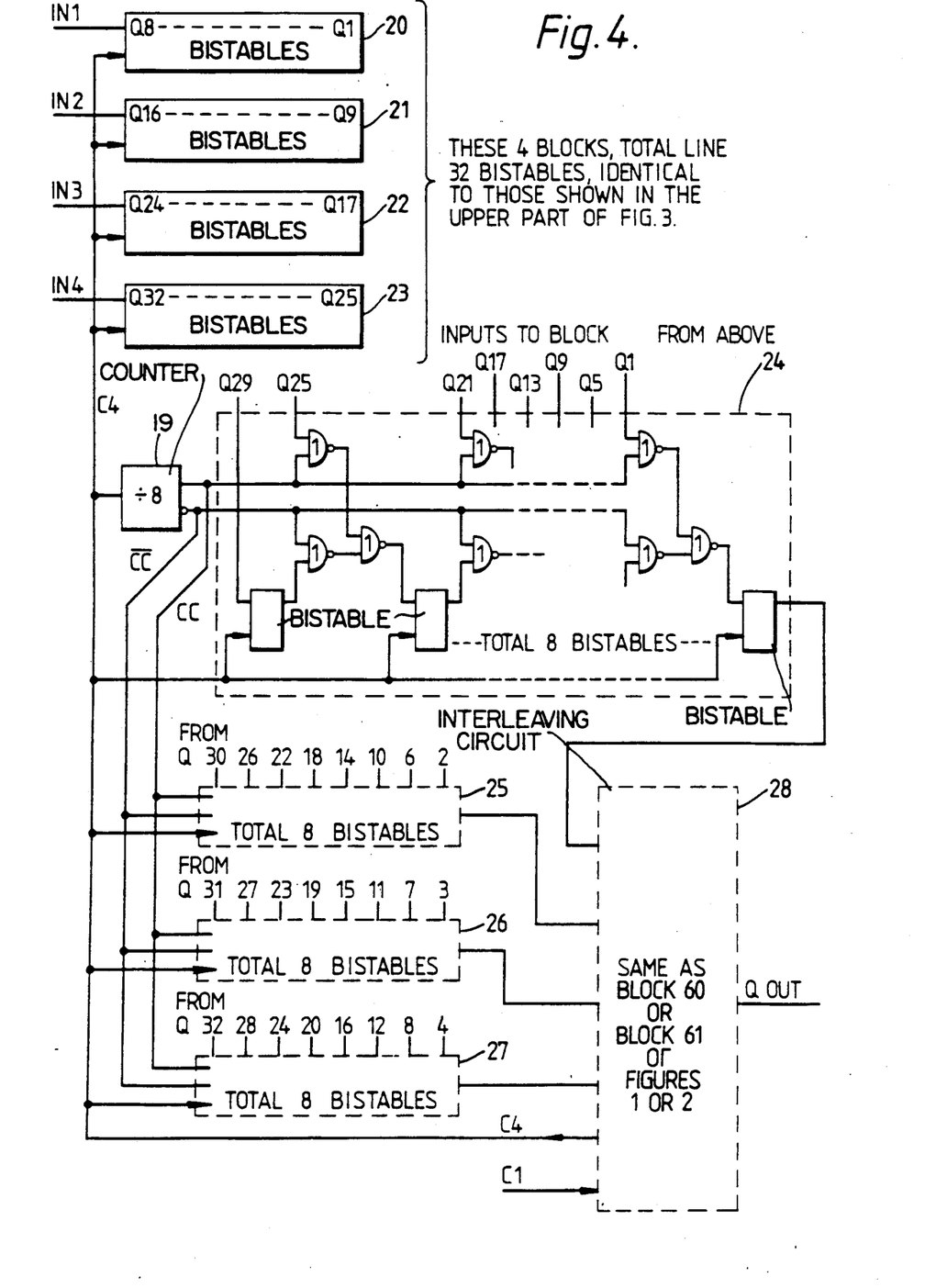
FIG. 4 is a block diagram of one known embodiment of apparatus for byte interleaving.

In the case of byte interleaving, it would be an obvious advantage if the amount of processing which has to be performed to meet this criterion could be reduced. FIG. 4 shows how to achieve this, by interchanging the bits of the input channels using logic processes whose timing tolerances are related only to the input rate, before being finally bit interleaved using simple circuitry like that of FIGS. 1 or 2. The stages in the byte stores have been numbered in reverse order, to illustrate the sequence of the bits in each input channel and in the output channel.

As can be seen in FIG. 4 each of the input signals IN1–IN4 is fed into a block of 8 D-type bistables, the blocks being respectively numbered 20, 21, 22 and 23. Each block then stores a byte with the first bit loaded from channel IN1 indicated at Q1, the second bit of IN1 at Q2 and so on. Similarly the first bit of IN2 is indicated at Q9. Each of these blocks is identical to the array Q1 to Q8 shown in FIG. 3. However in this embodiment the contents of blocks 20–23 are fed in parallel into four additional 8 D-type bistable blocks 24, 25, 26, and 27. Only block 24 is shown in detail as blocks 25, 26 and 27 are identical to it. The result of this operation is that block 24 holds the 8 bits Q1, Q5, Q9, Q13, Q17, Q21, Q25 and Q29, block 25 the bits Q2, Q6 etc. The bits from the four input channels have thus been interchanged. The contents of the four blocks 24 . . . 27 are then read out and interleaved by a circuit 28 which corresponds to the arrays of NOR-gates shown in FIGS. 1 or 2.

Figure 5:
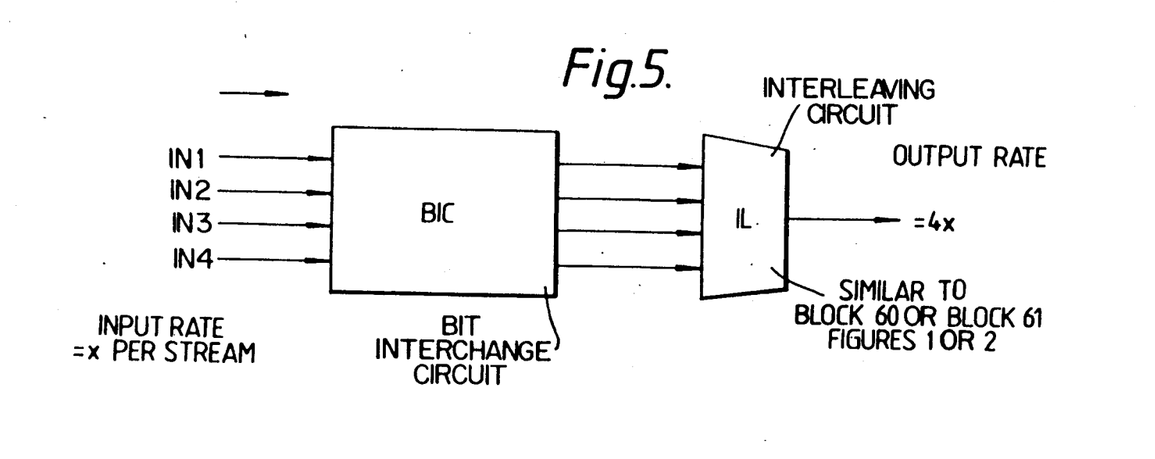
FIG. 5 is a simplified diagram of the embodiment of FIG. 4.

Referring now to FIG. 5 of the drawings this is a much simplified version of FIG. 4 in which the bit interleaving part of FIG. 4, namely block 28, is shown as IL and the bit interchange circuit, which makes up the remainder of FIG. 4, as BIC.

Figure 6:
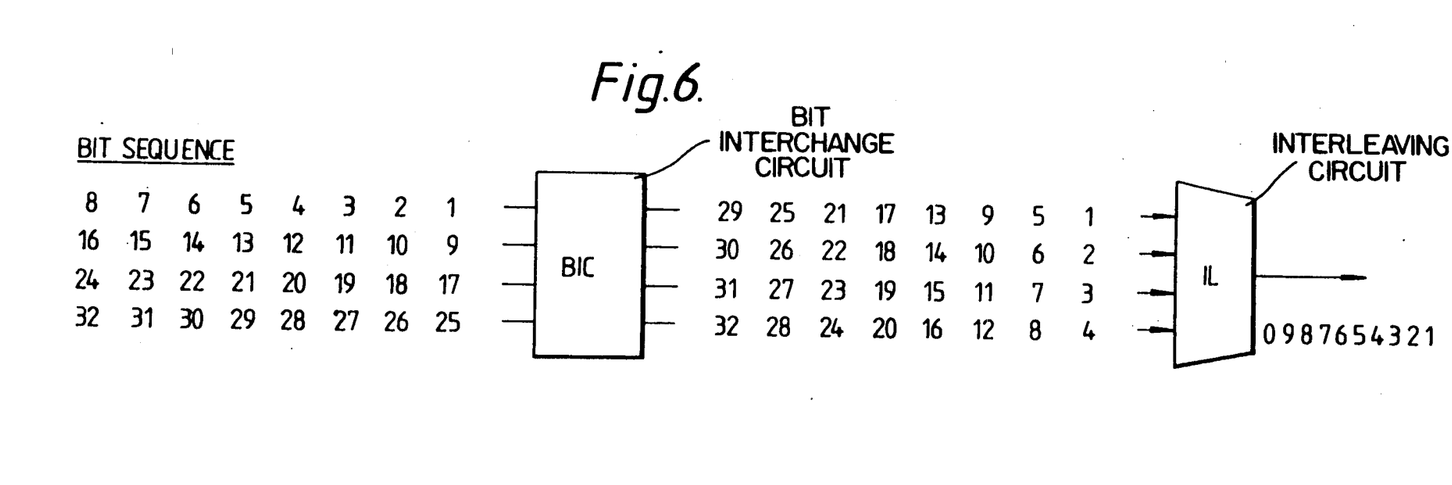
FIG. 6 is a timing diagram associated with FIG. 5.

As can be seen in FIG. 6 the block BIC receives four data inputs at a rate x and interleaves these as already described.

The circuitry and methods shown in FIGS. 1–6 are disclosed in pending U.S. patent application Ser. No. 364,826.

Figure 7:
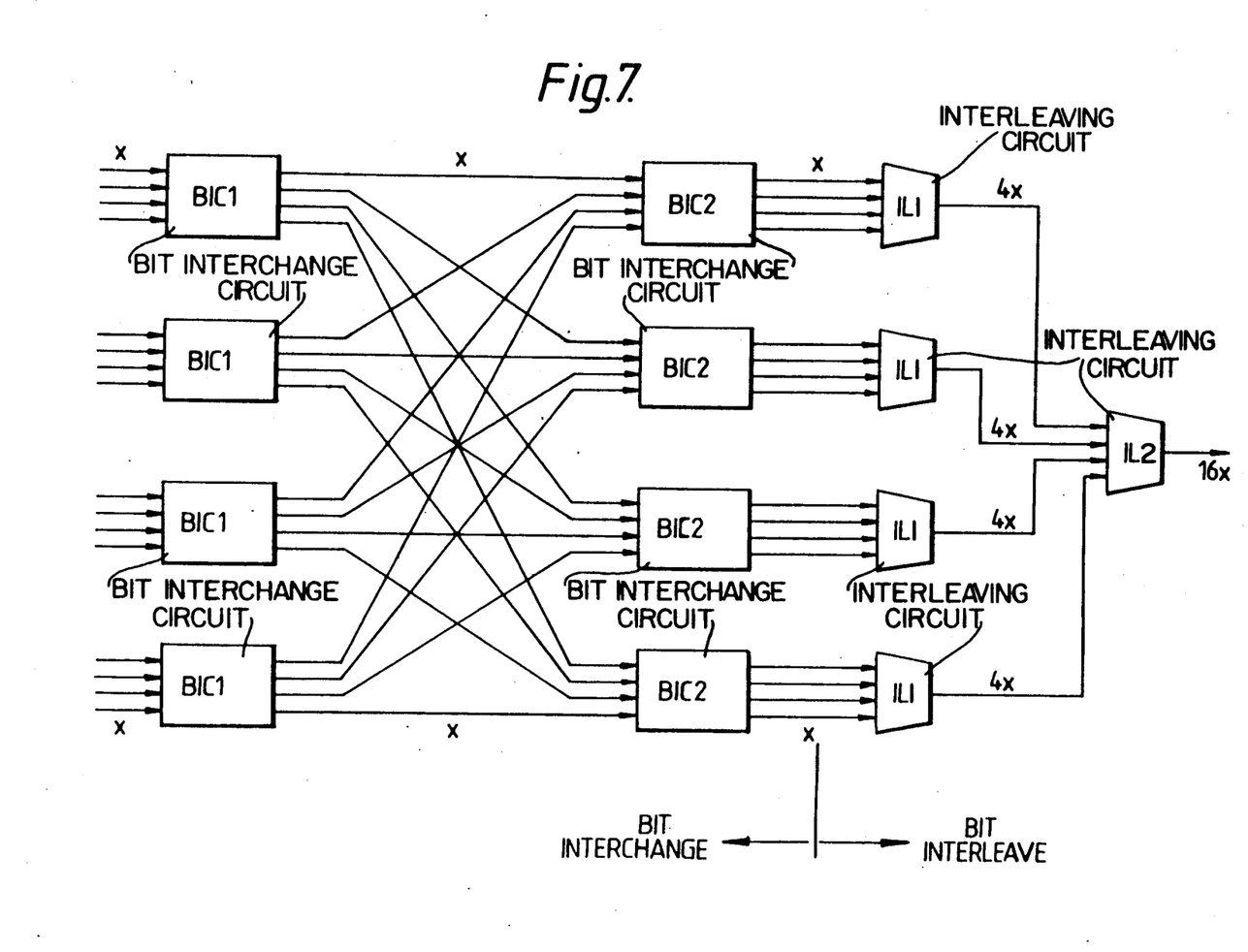
FIG. 7 is a block diagram of bit interleaving apparatus according to the present invention.

FIG. 7 shows how this basic unit of block BIC and circuit IL can be used to byte interleave a greater number of inputs.

FIG. 7 shows 16 inputs each at bit rate x with their bytes/frames phase already aligned. In FIG. 7 there are four primary blocks BIC1 each receiving four inputs at a bit rate x and a similar number of secondary blocks BIC2 each receiving an input from one of the primary blocks BIC1. As can be seen the four bit interchanged outputs of each primary block BIC1 is fanned out so that one output goes to each of the second set of blocks BIC2. These latter blocks are identical in function to the blocks BIC1 of the first set so that the input streams are still further interchanged.

The four outputs of each of the secondary blocks BIC2 are supplied to an individual circuit IL1 forming part of a first stage of four IL1 circuits where the interchange bits are interleaved so as partially to restore the original byte orientation. Each first stage IL1 circuit outputs a data stream at a bit rate of 4 x and the four data streams so generated are supplied to a final IL2 circuit which completes the interleaving to produce an output signal at a bit rate of 16 x which consists of the 16 input streams byte interleaved.

Figure 8:
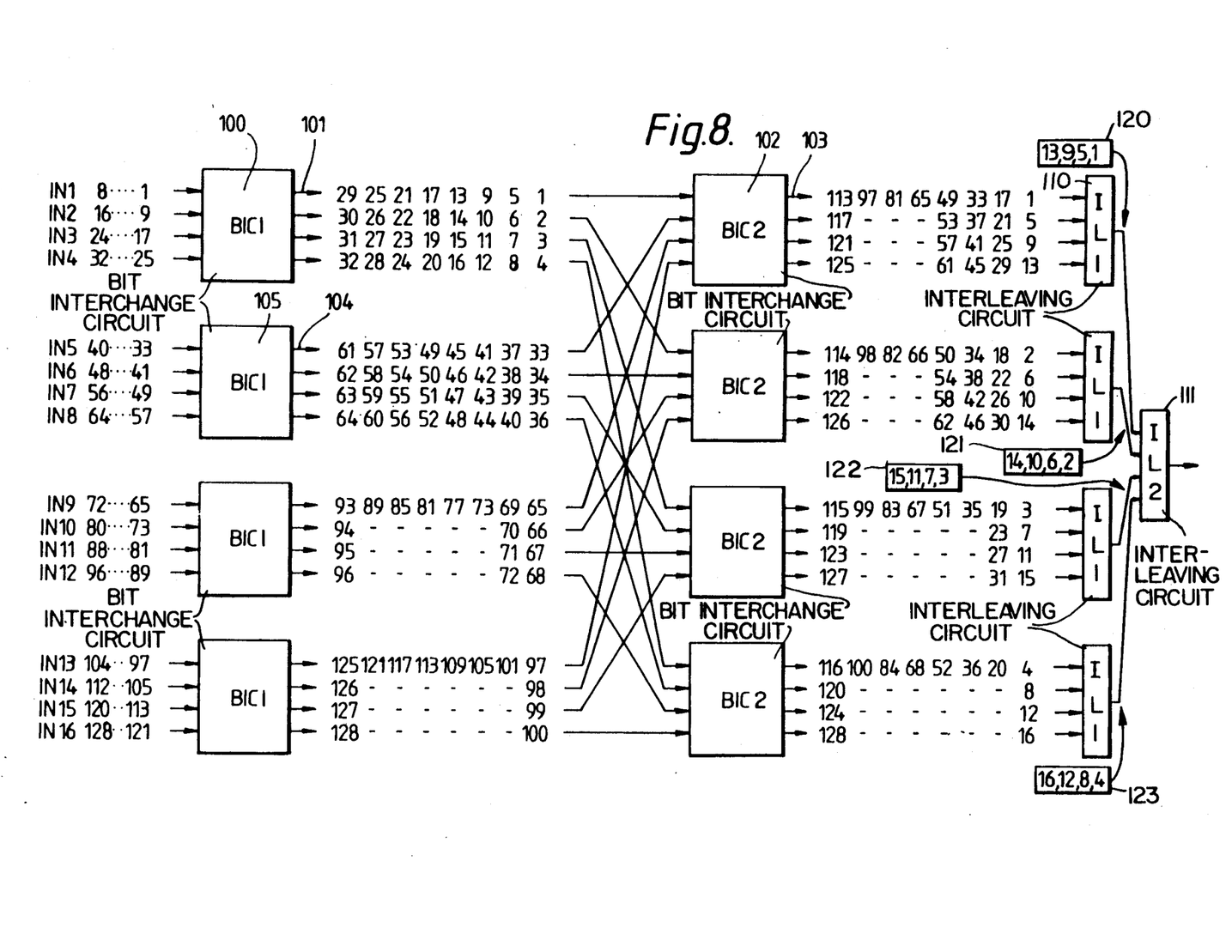
FIG. 8 illustrates the operation of the embodiment of FIG. 7.

FIG. 8 of the drawings show the bit interchange patterns as the signals pass through the primary and secondary blocks BIC1 and BIC2. From FIG. 8 it can be seen that BIC1 block 100 outputs at 101 a data stream which comprises the 1st and 5th bits of input IN1, the 1st and 5th bits of input IN2 and so on.

In the second stage BIC2 block 102 outputs at 103 the 1st and 5th bits of the data stream from output 101, the 1st and 5th bits of the output 104 of first stage BIC1 block 105 and so on.

In fact the outputs from block 102 contain bits from all of the input streams IN1 to IN16. The four outputs of block 102 are supplied to an IL1 circuit 110 where they are interleaved into a single output stream 1, 5, 9, 13 etc. This output stream along with the other three output streams are supplied to the final output block IL2, which has been numbered 111, where the four streams are interleaved to provide the final byte interleaved output signal. The boxes 120, 121, 122 and 123 show the first four bits output by each of the first stage IL1 blocks. As can be seen the first four parallel bits output from the first stage IL1's circuit of the first four bits of IN1, and the second four parallel bits consist of the next four bits of IN1.

As already described the output of the final IL1 circuit 111 comprises the 16 input data streams IN1 . . . IN16 byte interleaved.

The embodiment of FIGS. 7 and 8 show 16 input data streams at a rate x being interleaved to form a single output data stream at rate 16 x. It will however be apparent that the arrangement proposed can be expanded to handle greater numbers of input streams.

Figure 9:
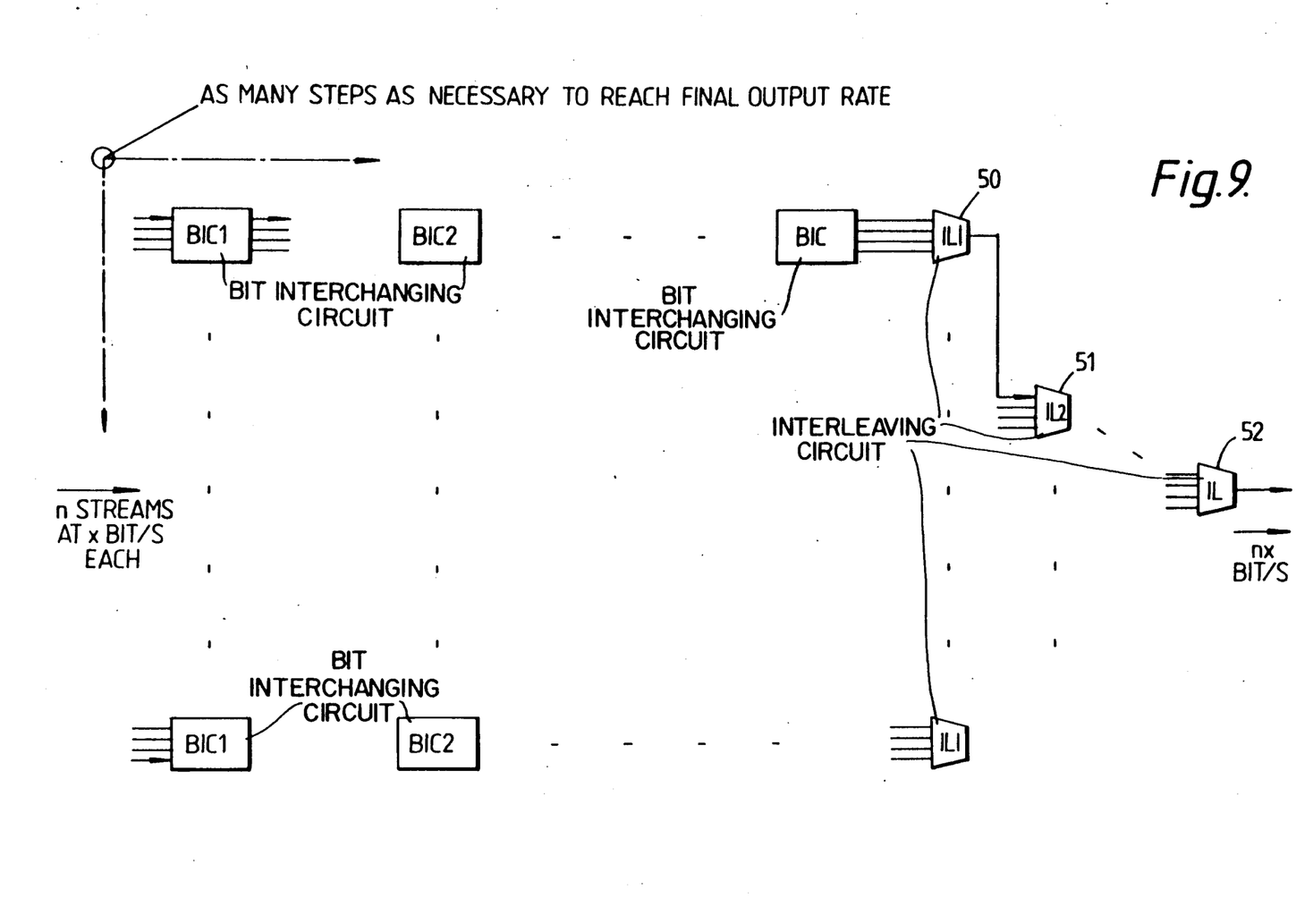
FIG. 9 is a diagram showing how the embodiment of FIG. 8 can be expanded.

FIG. 9 shows in diagramatic form the basic concept behind such an expansion. Thus if there are n input streams to be byte interleaved into a single output stream of rate nx, then the square root of n stages of blocks BIC will be required before the final IL stages.

In the embodiments described so far each block BIC handles 4 input streams. At the first stage 50 of circuits IL1 there is one IL circuit for every 4 input streams. At the second stage 51 the output of each first stage IL1 feeds one input of a second stage IL2 so that there is one second stage IL2 for every four first stage IL1's. The ratio of circuits between stages obviously depends on the number of inputs handled by each BIC. It will be appreciated that each BIC block and IL stage need not be linked to four inputs and four outputs.

In FIG. 9 the connections between the various blocks BIC have not been shown as these become physically complex as the number of blocks increases. However for a 32 input system the arrangement can be looked upon as two sets of 8 blocks BIC1, BIC2 as shown in FIG. 7 interconnected to two similar sets of 8 blocks which if shown would be numbered BIC3, BIC4. However, the first output of first block BIC2 (first being head of the vertical row) would be taken to block BIC3 directly opposite, its second output to the third block of BIC3, its third output to the fifth block BIC3 and its fourth output to the seventh. Similarly the second block down the row of BIC2 would have its first output to the second block down of BIC3, second output to the fourth BIC3 block and so on until all the blocks are interconnected. The important factor is that the original incoming data streams have their bits interchanged in such a manner that if there are n input streams to be interleaved the first of the bit interchanged streams to be applied to an IL circuit would be in the form 1, n+1, 2n+1 . . . 7n+1, the second 2, n+2, 2n+2 etc. and so on. This means that the IL circuits can then interleave the interchanged signals in a simple manner to reach the desired byte interleaved output.

I claim:
1. A digital communications apparatus for receiving a plurality of parallel, multiple bit, digital input data streams all at a predetermined bit rate, and for interleaving multiple bit sequences of a predetermined length from each of the input data streams into a single, multiple bit, digital output data stream at a higher bit rate greater than said predetermined rate, the apparatus comprising:

(a) a plurality of first stage bit interchange means, each operative for receiving, and interchanging bits of, the input data streams, and for generating a plurality of first bit-interchanged data streams at the predetermined bit rate, said bits of each input data stream being distributed among each of the first bit-interchanged data streams;

(b) a plurality of second stage bit interchange means, each connected to all of said first stage bit interchange means for receiving the first bit-interchanged data streams therefrom, each second stage bit interchange means being connected to each first stage bit interchange means by one of said first bit-interchanged data streams, said second stage bit interchange means being operative for interchanging the bits of the first bit-interchanged data streams from all said first stage bit interchange means to generate a plurality of second bit-interchanged data streams; and (c) means for interleaving the second bit-interchanged data streams to produce said output data stream at said higher bit rate.

2. Apparatus as claimed in claim 1, wherein each first stage bit interchange means comprises a plurality of first storage means, each connected to a respective said input data stream and operative serially to store sequences of successive bits of said respective input data stream; each of the bit sequences stored in said first storage means being fed in parallel into a plurality of second storage means so that the bits of said stored sequences are interchanged; and the stored sequences of said second storage means being fed in series to provide the first bit-interchanged streams.

3. Apparatus as claimed in claim 2, wherein each first and second storage means comprise bistable devices connected in series, the number of serially connected bistable devices in each stage being equal to the number of bits in said multiple bit sequences.

4. Apparatus as claimed in claim 3, wherein each said second storage means is connected to a respective said first storage means by first sets of gates, each said first sets of gates comprising a pair of NOR-gates having outputs which are connected to a third NOR-gate having an output which is connected to an input of one said bistable device in the second storage means.

5. Apparatus as claimed in claim 4, wherein the pair of NOR-gates of each said first sets of gates have respective inputs for receiving outputs from bistable devices in different ones of said first storage means, and for receiving outputs from a bistable device in the second storage means and timing signals, the timing signal received at one input of one of said pair of NOR-gates being the inverse of the timing signal received by the other NOR-gate of said pair.

6. Apparatus as claimed in claim 5, wherein each first stage bit interchange means has four first storage means, each connected to a respective input data stream, and four second storage means, each respectively connected to the first storage means, each first stage bit interchange means being operative to interchange the bits of the four input data streams to produce four bit-interchanged data streams, each containing bits from each of the input data streams.

7. Apparatus as claimed in claim 6, wherein the interleaving means is operative for interleaving the second bit-interchanged data streams and comprises a plurality of bistable devices connected in series and equal in number to the number of input data streams, means for dividing said predetermined bit rate by the number of input data streams, and a plurality of gates connected to each bit-interleaved data stream and enabled by said dividing means.

8. Apparatus as claimed in claim 7, wherein said gates of the interleaving means are arrayed in sets of three gates, two gates from each set being connected to different interleaved bit streams and having outputs connected to an input of one of the serially connected bistable devices.

9. Apparatus as claimed in claim 6, wherein the interleaving means is operative for interleaving the second bit-interchanged data streams and comprises means for dividing the predetermined bit rate of the input data streams by the number of input data streams, gate means connected to each bit-interleaved data stream and controlled by said dividing means, said gate means having outputs, and a single gate to which the outputs of all said gate means are connected.

10. Apparatus as claimed in claim 1, and further comprising at least one additional plurality of successive stage bit interchange means, each connected to all of said second stage bit interchange means for receiving the second bit-interchanged data streams therefrom, each successive stage bit interchange means being connected to each second stage bit interchange means by one of said second bit-interchanged data streams, said successive stage bit interchange means being operative for interchanging the bits of the second bit-interchanged data streams from all said second stage bit interchange means to generate a plurality of successive bit-interchanged data streams, and each successive stage bit interchange means being connected to said interleaving means.

* * * * *